United States Patent Office 3,420,980
Patented Jan. 7, 1969

3,420,980
METHOD AND MATERIAL FOR HARD-SURFACING
Carmine Annunziata, Bayonne, and Robert H. Lee, Lakeridge, Matawan, N.J., assignors to Union Carbide Corporation, a corporation of New York
No Drawing. Filed July 22, 1966, Ser. No. 567,080
U.S. Cl. 219—146        7 Claims
Int. Cl. B23k 35/22

This invention relates to electric arc weld surfacing. More particularly, this invention relates to a welding composition and to a composite electrode including such composition for use in an electric arc weld surfacing process.

Industry, and particularly the railroad industry, is constantly seeking new ways for depositing hard-surfaces on metal parts which are subjected to wear and impact during normal use. The railroad industry must constantly service or replace rails because of wear. Only a slight amount of wear is caused by the wheels rolling over the rails. At the rail ends, however, wear is excessive because of the batter of the wheels as they pass over the rail joint and drop on the succeeding rail. As wear increases, the batter becomes more severe, thereby accelerating more wear in a vicious circle.

The constant batter of the wheels on the rail ends causes loosening of rail ties, an uneven ride of the railroad cars, and promotes the formation and growth of transverse fissures, detail fractures and gage corner shelling of the rails, which often result in rail failure in service. Such types of rail damage usually originate as small internal imperfections in the rail that produce minute cracks, these cracks grow larger by a fatigue failure mechanism caused by stresses, vibrations, and batter—especially at the rail ends.

One of the most convenient ways of applying a coating to the worn areas would be by utilizing a consumable wire electric arc process which is capable of producing the alloyed surface with the desired properties and which does not require an auxiliary shielding medium to protect the arc or weld puddle.

Up until now this has not been accomplished. Attempts at producing hard-surfacing deposits with electric arc welding processes have resulted either in deposits which were porous or sensitive to impacts.

The principal object of the invention is the provision of a new welding composition which may be fed into an electric arc to produce porosity-free, ductile, hard-surfacing weld deposits on a workpiece.

Another major objective is to provide a new and improved electrode for producing hard-surfacing weld deposits without any auxiliary shielding medium.

A further object is to provide a hollow electrode containing a core of welding composition forming a composite electrode which produces a hard-surfacing deposit without the need of an auxiliary shielding medium.

Yet another object is to provide a method for producing a hard-surfacing deposit with an electric arc process wherein no auxiliary shielding medium is employed.

The accomplishment of these and other objects will become clear from a reading of the following description.

It is now possible, according to this invention, to achieve a hard-surfacing ductile, nonbrittle deposit on a steel workpiece by a process which does not require an auxiliary shielding medium. While this invention is suitable for hard-surfacing most carbon steel surfaces, a major utility of the invention is for hard-surfacing rail steels.

The objects of the invention are accomplished, in general, by maintaining an arc between a consumable electrode and a workpiece while continuously advancing such electrode towards the arc; simultaneously, therewith, a flux or welding composition is fed into the arc. The welding composition consists essentially of from about 5 to about 20 weight percent of at least one aluminum-bearing ingredient taken from the class of pure aluminum powder and alloys of aluminum; at least one deoxidizer taken from the class consisting of ferromanganese-silicon, ferromanganese, ferrosilicon, zirconium-silicon, calcium-silicon, and ferroaluminum-silicon in amounts of from about 5 to about 20 weight percent; at least one titanium-bearing compound taken from the class consisting of pure titanium, titanium oxide, titanium suboxide, ferrotitanium, and alkali and alkaline earth metal titanates in amounts of from about 5 to about 20 weight percent and iron powder in amounts of from about 5 to about 70 weight percent. Also included in the welding composition, in a preferred embodiment of the invention, is at least one halide taken from the class consisting of aluminum fluoride, the halides of the alkali metals and the alkaline earth metals in amounts of from about 5 to about 40 weight percent. A slagging ingredient such as magnesium-silicate or titanium dioxide is preferably provided in the welding composition.

While the invention in its broadest aspect contemplates feeding the ingredients of the welding composition into the arc along with the electrode in any desired manner, the preferred embodiment contemplates the ingredients being provided in a cavity or cavities on the inside of the electrode. Thus, hereinafter, reference will be made to the hollow steel sheath containing a core of weld composition which composite will, from time-to-time be referred to as the "tube rod."

The tube rod of the invention, examples of which will be described hereinafter, produces hard-surfacing deposits on carbon steels such as mild carbon and rail steel. Rail steel is usually characterized by at least 0.6 weight percent carbon. Mild steel is characterized by at least 0.08 up to 0.25 weight percent carbon. The hard-surfacing deposits produced on such base metals are porosity-free, ductile, and have excellent resistance to wear and batter. All of these characteristics are achieved without the necessity for any shielding medium, thus reducing the cost of the welding operation.

It has been found in order to achieve a hard-surfacing deposit that is porosity-free, resistant to impact, and exhibits good wear resistance on carbon steels, that the welding composition should contain aluminum and titanium. In the preferred embodiment of the invention, it has been found that the aluminum should be added as pure aluminum powder and that the titanium should be added as a suboxide ($Ti_2O_3$) of titanium. It is postulated that the aluminum which is a strong deoxidizer reduces some of the titanium suboxide, thereby permitting titanium to pass through the arc to the weld puddle. Also, residual aluminum powder will more vigorously protect the puddle against air. Titanium and aluminum deoxidize the weld puddle and promote the formation of carbide and nitride phases while not embrittling the ferrite phase. Carbides and nitrides are essential for hardness. However, care must be taken to avoid excessive formation of some carbonitrides. Thus, according to the invention, pure aluminum and titanium-bearing compounds should be present in the range of from 1 to about 5 weight percent each based on the total weight of the tube rod or about 5 to about 30 weight percent of the flux.

Specific examples of the welding composition of the invention are as follows; in each example the tube rod diameter was 3/32 in., however, rods of different diameters may obviously be utilized:

EXAMPLE I

| | Percent |
|---|---|
| Iron | 13.5 |
| Aluminum (powder) | 15.0 |
| Ferromanganese-silicon | 15.0 |
| High carbon-ferrochrome | 12.0 |
| Titanium suboxide | 15.0 |
| Magnesium-silicate | 18.0 |
| Cryolite ($Na_3AlF_6$) | 11.5 |
| | 100.0 |

The above-ingredients were bonded with about 10 percent by weight of potassium silicate. This composition was then provided in an 0.08 percent carbon steel sheath and comprised 20 percent by weight of the total electrode. This 3/32 in. diameter tube rod was used to deposit a hard surface on 700 deg. F. preheated rail steel at direct current reverse polarity, 300–400 amperes, 27–30 voltage, and produced a hardness in the range of 310–330 Brinell. To facilitate test procedures, the same welding conditions were used in each of the succeeding examples.

EXAMPLE II

| | Percent |
|---|---|
| Iron | 7.5 |
| Aluminum | 15.0 |
| Ferromanganese-silicon | 15.0 |
| Ferrotitanium (70 percent Ti) | 21.0 |
| High carbon ferrochrome | 12.0 |
| Magnesium-silicate | 18.0 |
| Cryolite | 11.5 |
| | 100.0 |

These ingredients were bonded with 10 percent by weight potassium silicate. The composition was provided in 0.08 percent carbon steel sheath and comprised 20 percent by weight of the total electrode. The hardness of surfacing deposits made on 700 deg. F. preheated rail steel was from about 324 to 344 Brinell utilizing same welding conditions as in Example I.

EXAMPLE III

| | Percent |
|---|---|
| Iron | 13.5 |
| Aluminum | 15.0 |
| Ferromanganese-silicon (FeMnSi) | 15.0 |
| High carbon ferrochrome | 12.0 |
| Titanium suboxide | 15.0 |
| Titanium dioxide | 18.0 |
| Calcium fluoride | 11.5 |
| | 100.0 |

These ingredients were bonded with 10 percent by weight potassium silicate. The composition was provided 0.10 percent carbon sheath and comprised about 20 percent by weight of the total electrode. The hardness developed on 700 deg. F. preheated rail steel was about 300 to 344 Brinell, utilizing same welding conditions as in Example I.

EXAMPLE IV

To the composition of Example I was added an additional 12.5 percent by weight high carbon ferrochrome and 12.5 weight percent ferromanganese-silicon. These were bonded with potassium silicate as before. The hardness achieved on preheat rail steel was about 37 to 41 Rockwell C or 352–400 Brinell. It was found that by adding various amounts of ferroalloys, such as ferromanganese-silicon, ferrochrome, or combinations of these, the hardness of the weld metal deposited on mild steel, 0.08 to about 0.2 percent by weight carbon, could range up to about 550 Brinell.

EXAMPLE V

| | Percent |
|---|---|
| Iron | 53.0 |
| Aluminum | 10.0 |
| Ferromanganese-silicon | 10.0 |
| Titanium suboxide | 10.0 |
| Magnesium-silicate | 12.0 |
| Cryolite | 5.0 |
| | 100.0 |

These ingredients were mechanically mixed and provided in a 0.10 percent by weight carbon steel sheath. The composition comprises about 26 weight percent of the total electrode. The hardness developed in mild steel with no preheat was about 300 Brinell.

EXAMPLE VI

| | Percent |
|---|---|
| Iron | 53.0 |
| Ferroaluminum | 10.0 |
| Ferrozirconium-silicon | 10.0 |
| Titanium suboxide ($Ti_2O_3$) | 10.0 |
| Ferrochrome | 12.0 |
| Calcium fluoride | 5.0 |
| | 100.0 |

These ingredients are mechanically mixed and provided in a 0.10 carbon steel sheath and comprised about 27 percent by weight of the total electrode. Hardness of surfacing deposit on 500 deg. F. preheated rail was about 330 Brinell.

EXAMPLE VII

| | Percent |
|---|---|
| Iron | 42.0 |
| Aluminum | 11.0 |
| Ferromanganese-silicon | 1.5 |
| Ferrozirconium-silicon | 9.0 |
| Titanium suboxide | 7.5 |
| Magnesium silicate ($MgSiO_4$) | 15.0 |
| Calcium fluoride (CaF) | 6.0 |
| High carbon ferrochrome | 8.0 |
| | 100.0 |

These ingredients were mechanically mixed and provided in 0.10 carbon steel and comprised about 22 percent by weight of the tube rod. Hardness developed on rail steel in 365 Brinell.

EXAMPLE VIII

| | Percent |
|---|---|
| Iron | 43.0 |
| Aluminum | 10.0 |
| Ferromanganese silicon | 10.0 |
| Titanium suboxide | 10.0 |
| Magnesium silicate | 10.0 |
| Rare earth alloy (32% R.E.-42% Si-12% Mn) | 5.0 |
| High carbon ferrochrome | 12.0 |
| | 100.0 |

These ingredients were bonded with 5 percent potassium silicate and comprised about 30 percent of the total weight of the electrode. The hardness developed was 340 Brinell in preheated rail steel.

EXAMPLE IX

| | Percent |
|---|---|
| Iron | 34.0 |
| Ferroaluminum silicon | 15.0 |
| Ferrozirconium silicon | 2.0 |
| Aluminum powder | 3.0 |
| Titanium suboxide | 10.0 |
| Ferromanganese silicon | 15.0 |
| Magnesium silicate | 12.0 |
| Cryolite | 6.0 |
| Potassium titanate | 3.0 |
| | 100.0 |

These ingredients were mechanically mixed and provided in 0.10 carbon sheath and comprised 30 percent of the total weight of the electrode. Hardness of the deposit on mild steel was about 220 Brinell.

EXAMPLE X

| | Percent |
|---|---|
| Iron | 68.5 |
| Aluminum | 6.0 |
| Titanium suboxide | 6.0 |
| Ferromanganese silicon | 6.0 |
| Magnesium silicate | 4.0 |
| Cryolite | 4.0 |
| Ferrochrome | 5.5 |
| | 100.0 |

These ingredients are provided in a 0.10 carbon sheath so that the flux composition comprised 50 percent by weight of the total electrode. Hardnesses of from 380–400 Brinell can be achieved on preheated rail steel.

It is preferred that the titanium-bearing compound be a titanium suboxide. Titanium suboxide contains about 75–85 percent titanium oxide and about 10–20 percent titanium suboxide. The total titanium is from about 69–71 percent.

This compound also contains some carbon, usually from about 3 to about 8 percent. The suboxide of titanium apparently permits more efficient transfer of titanium and carbon across the arc into the weld puddle where the aforementioned carbides and nitrides essential to hardness and wear resistance are formed. Titanium also forms a nongassing compound of titanium, thereby preventing porosity; also, titanium oxide having a greater affinity for oxygen than carbon will combine with oxygen and prevent the formation of porosity causing carbon monoxide gas.

A high carbon ferrochrome is preferred because the compound provides carbon as well as chrome metal. These elements aid in forming chrome nitrides and chrome carbides.

In the above-formulations, the ingredients are all finely ground prior to being bonded or prior to being thoroughly mixed and placed in the hollow steel sheath. The sheath can be of any chemistry but is usually rimmed quality steel. It should be understood that any metallic element in the flux could be provided as part of the sheath; however, it is preferred to include these metallics in this flux. Preferably, the sheath is made from a C–1008, 1010, or 1020 steel, which means that the carbon content of the sheath varies from 0.08 to 0.20. The granular flux is provided in a continuous strip of the sheath steel that is preformed to accept the flux. The sheath is then firmly closed to form a tube about the flux prior to drawing or rolling to size.

The core percent, that is the weight of the flux core based on the total weight of the electrode, can be varied within a wide range, as for example from 10 to 50 weight percent of the total weight of the electrode. Core percents in excess of 50 make it difficult and costly to fabricate the wire. Additionally, the object of the tube rod of the invention is to provide a chemical effect while also achieving high quality welding characteristics such as bead shape, slag removal, etc. This preferred combination is accomplished within a relatively narrow core range of from about 15 to 35 weight percent. Which particular core percent is selected depends on the chemical effect desired consistent with preferred welding characteristics.

While the invention has been described with respect to several typical embodiments, some of which are preferred to others, it is understood that the invention is not limited by these examples but rather modifications of the ingredients and percentages thereof disclosed therein which result in essentially the same chemical effect are included within the scope of this invention.

What is claimed is:

1. A consumable electrode for electric arc welding comprising a steel sheath containing a welding composition comprising from about 5 to about 30 weight percent of at least one aluminum-bearing ingredient taken from the class of aluminum and alloys of aluminum; from about 5 to about 20 percent by weight of at least one deoxidizer taken from the class consisting of ferromanganese-silicon, ferromanganese, ferrosilicon, zirconium-silicon, calcium silicon, ferroaluminum-silicon, alkali metals and alkaline earth metals; from about 5 to about 30 percent by weight of at least one titanium-bearing compound taken from the class consisting of titanium, titanium oxide, titanium suboxide, ferrotitanium and alkali and alkaline earth metal titanates; and from about 5 to about 70 percent by weight iron powder said ingredients comprising between 10 and 50 percent by weight of the total weight of the electrode.

2. Electrode according to claim 1 wherein the aluminum-bearing ingredient is aluminum and the titanium-bearing compound is titanium suboxide.

3. A consumable electrode for electric arc welding according to claim 1 and also including from about 5 to about 40 percent by weight of at least one halide taken from the class consisting of aluminum fluoride, the halides of the alkali metals and the alkaline earth metals, said ingredients comprising between 10 and 50 percent by weight of the total weight of the electrode.

4. Electrode according to claim 3 wherein said ingredients comprise 15 to 35 percent by weight of the total weight of the electrode.

5. Electrode according to claim 3 wherein the aluminum-bearing ingredient is aluminum and the titanium-bearing compound is titanium suboxide.

6. A consumable electrode for electric arc welding comprising a steel sheath filled with the following ingredients: about 13.5 weight percent iron; about 15.0 weight percent aluminum powder; about 15.0 weight percent ferromanganese-silicon; about 12.0 weight percent ferrochrome; about 15.0 weight percent titanium suboxide, about 18 weight percent magnesium silicate and about 11.5 weight percent cryolite, said ingredients comprising between 15 and 35 weight percent of the total electrode.

7. Electrode according to claim 6 wherein the ingredients comprise about 20 percent by weight of the total electrode.

References Cited

UNITED STATES PATENTS

| | | | |
|---|---|---|---|
| 2,464,836 | 3/1949 | Thomas et al. | 219—146 |
| 2,909,778 | 10/1959 | Landis et al. | 219—146 |
| 3,175,074 | 3/1965 | Culbertson | 219—146 |
| 3,330,934 | 7/1967 | Quaas | 219—146 |
| 3,365,565 | 1/1968 | Claussen | 219—146 |
| 3,372,057 | 3/1968 | Seifahrt | 117—206 |

RICHARD M. WOOD, *Primary Examiner.*

B. A. STEIN, *Assistant Examiner.*